US009479011B2

(12) United States Patent
Kanakasabai et al.

(10) Patent No.: US 9,479,011 B2
(45) Date of Patent: Oct. 25, 2016

(54) METHOD AND SYSTEM FOR A DUAL CONVERSION UNINTERRUPTIBLE POWER SUPPLY

(71) Applicant: General Electric Company, Schenectady, NY (US)

(72) Inventors: Viswanathan Kanakasabai, Karnataka (IN); Silvio Colombi, Losone (CH); Rajendra Naik, Karnataka (IN)

(73) Assignee: General Electric Company, Niskayuna, NY (US)

( * ) Notice: Subject to any disclaimer, the term of this patent is extended or adjusted under 35 U.S.C. 154(b) by 512 days.

(21) Appl. No.: 14/097,574

(22) Filed: Dec. 5, 2013

(65) Prior Publication Data

US 2015/0162782 A1 Jun. 11, 2015

(51) Int. Cl.
*H02J 7/00* (2006.01)
*H02J 9/06* (2006.01)
(52) U.S. Cl.
CPC .............. *H02J 9/062* (2013.01); *H02J 7/0013* (2013.01); *Y10T 307/344* (2015.04)
(58) Field of Classification Search
None
See application file for complete search history.

(56) References Cited

U.S. PATENT DOCUMENTS

| 5,075,565 | A | | 12/1991 | Severinsky et al. |
|---|---|---|---|---|
| 5,499,178 | A | * | 3/1996 | Mohan ..................... H02J 3/01 307/105 |
| 5,994,794 | A | | 11/1999 | Wehrlen |
| 6,628,012 | B2 | | 9/2003 | Reuter |
| 6,906,933 | B2 | | 6/2005 | Taimela |
| 7,450,406 | B2 | | 11/2008 | Glauser |
| 8,330,297 | B2 | | 12/2012 | Pines |
| 8,410,638 | B2 | | 4/2013 | Johnson |
| 2012/0306274 | A1 | | 12/2012 | Shetler, Jr. et al. |

FOREIGN PATENT DOCUMENTS

WO 2006026549 A2 3/2006

OTHER PUBLICATIONS

"Uninterruptable Power Supply System Selection, Installation, and Maintenance for Command, Control, Communications, Computer, Intelligence, Surveillance, and Reconnaissance (C4isr) Facilities",Headquarters, Department of the Army, pp. 2-18, Dec. 26, 2007.

* cited by examiner

*Primary Examiner* — Jared Fureman
*Assistant Examiner* — Aqeel Bukhari
(74) *Attorney, Agent, or Firm* — Nitin N. Joshi

(57) ABSTRACT

A method and system for an uninterruptible power supply (UPS) are provided. The UPS includes a three-phase high power transformer, an active or passive-rectifier configured to generate and regulate a set of DC link voltages, and a set of cascaded inverters configured to generate an AC voltage using the DC link voltages. The UPS also includes a set of bi-directional battery converters configured to charge a bank of backup batteries when power is available from an AC mains source and discharge the bank of backup batteries to generate a three-phase AC voltage when the AC mains source voltage falls outside a predetermined range. The UPS further includes a bypass switch configured to electrically couple the AC mains source directly to a load when the UPS is in a bypass mode of operation and electrically couple the bank of backup batteries to the load through the set of bi-directional battery converters and the transformer.

20 Claims, 6 Drawing Sheets

METHOD AND SYSTEM FOR A DUAL CONVERSION UNINTERRUPTIBLE POWER SUPPLY

BACKGROUND

This description relates to power supplies, and, more particularly, to methods and systems for a medium voltage battery backup uninterruptible power supply.

Uninterruptible power supplies (UPS) are used in many applications such as in data centers and hospitals to provide quality power to the load without any interruption even when there are outages or disturbances in the AC mains supply voltage. As the size of data centers increase, powering up the critical loads through a low voltage (e.g. 480 V) UPS is a challenge as the current magnitude increases significantly as the power requirement increases at that relatively low voltage, even hitting the limits of the low voltage switchgear. Processing the required power at a relatively higher voltage, such as medium-voltage (e.g. 4.16 KV or 13.8 kV) allows the current carrying requirement of the UPS to decrease. Thus, medium voltage conversion in the UPS (e.g. 4.16 kV or 13.8 kV) has advantages with respect to increased operating efficiency and reduced cabling cost. Moreover, switch components such as insulated-gate bipolar transistors (IGBT) degrade over time at near rated voltage and current. Operating higher voltage rated IGBTs at lower current may also improve reliability of the components in the UPS.

BRIEF DESCRIPTION

In one embodiment, an uninterruptible power supply (UPS) is configured to supply relatively high power at a relatively medium-voltage using a plurality of relatively low-power modules coupled in electrical series and includes a three-phase high power transformer, an active or passive-rectifier configured to generate and regulate a set of DC link voltages, and a cascaded set of inverters configured to generate a high alternating current (AC) voltage using the DC link voltages. The UPS also includes a set of bi-directional battery converters configured to charge a bank of backup batteries when power is available from an AC mains source and discharge the bank of backup batteries to generate a three-phase AC voltage at terminals of the three-phase high power transformer when the AC mains source voltage is outside a range of allowed limits. The UPS further includes a bypass switch configured to electrically couple the AC mains source directly to a load when the UPS is in a bypass mode of operation. This bypass path is also configured to couple the bank of backup batteries to the load through the set of bi-directional battery converters and the transformer when the main inverter is shut down for maintenance or has a fault.

In another embodiment, a method of operating an uninterruptible power supply (UPS) system includes selecting one of a normal mode of operation, a battery mode of operation, and a bypass mode of operation for the UPS wherein in the normal mode of operation, the method includes supplying electrical power from an AC mains source to a load through a rectifier and a set of inverters of the UPS and maintaining a charge on a bank of backup batteries using a battery converter operating as an active rectifier. In the battery mode of operation, the method includes supplying electrical power from the bank of backup batteries through a bi-directional battery converter to a load through the rectifier and the set of inverters of the UPS. In the bypass mode of operation, the method includes supplying electrical power from the AC mains source directly to a load through the bypass switch.

In yet another embodiment, an uninterruptible power supply (UPS) system includes an AC mains source including an AC mains switch, the AC mains source is configured to at least one of supply electrical power to a load through a bypass switch and supply electrical power to the load through a double conversion UPS, positions of the AC mains switch and the bypass switch defining a mode of operation of the UPS system wherein when both switches are closed, the UPS system is in a bypass mode of operation, when the AC mains switch is open and the bypass switch is open or closed, the UPS system is in a battery mode of operation; when the AC mains switch is closed and the bypass switch is open, the UPS system is in a normal mode of operation. The UPS system also includes an uninterruptible power supply (UPS) including a three-phase high power transformer, an active or passive rectifier configured to generate and regulate a set of DC link voltages, and a cascaded set of inverters configured to generate a high alternating current (AC) voltage using the DC link voltages. The UPS also includes a set of bi-directional battery converters configured to charge a bank of backup batteries when power is available from an AC mains source and discharge the bank of backup batteries to generate a three-phase AC voltage at terminals of the three-phase high power transformer when the AC mains source voltage is outside a predetermined threshold range.

DRAWINGS

FIG. 1 is a schematic diagram of a three-phase high power transformer-based medium voltage uninterruptible power supply (MV-UPS) system.

FIG. 2 is a schematic diagram of power flow through the UPS system in a normal operating mode in accordance with an example embodiment of the present disclosure.

FIG. 3 is a schematic diagram of power flow through the UPS system in a bypass operating mode in accordance with an example embodiment of the present disclosure.

FIG. 4 is a schematic diagram of power flow through the UPS system in a battery operating mode in accordance with an example embodiment of the present disclosure.

FIG. 5 is a schematic diagram of power flow through the UPS system in a backfeed operating mode in accordance with an example embodiment of the present disclosure.

FIG. 6 is a schematic diagram of an alternate embodiment of a UPS system in accordance with an example embodiment of the present disclosure.

Figure 1:
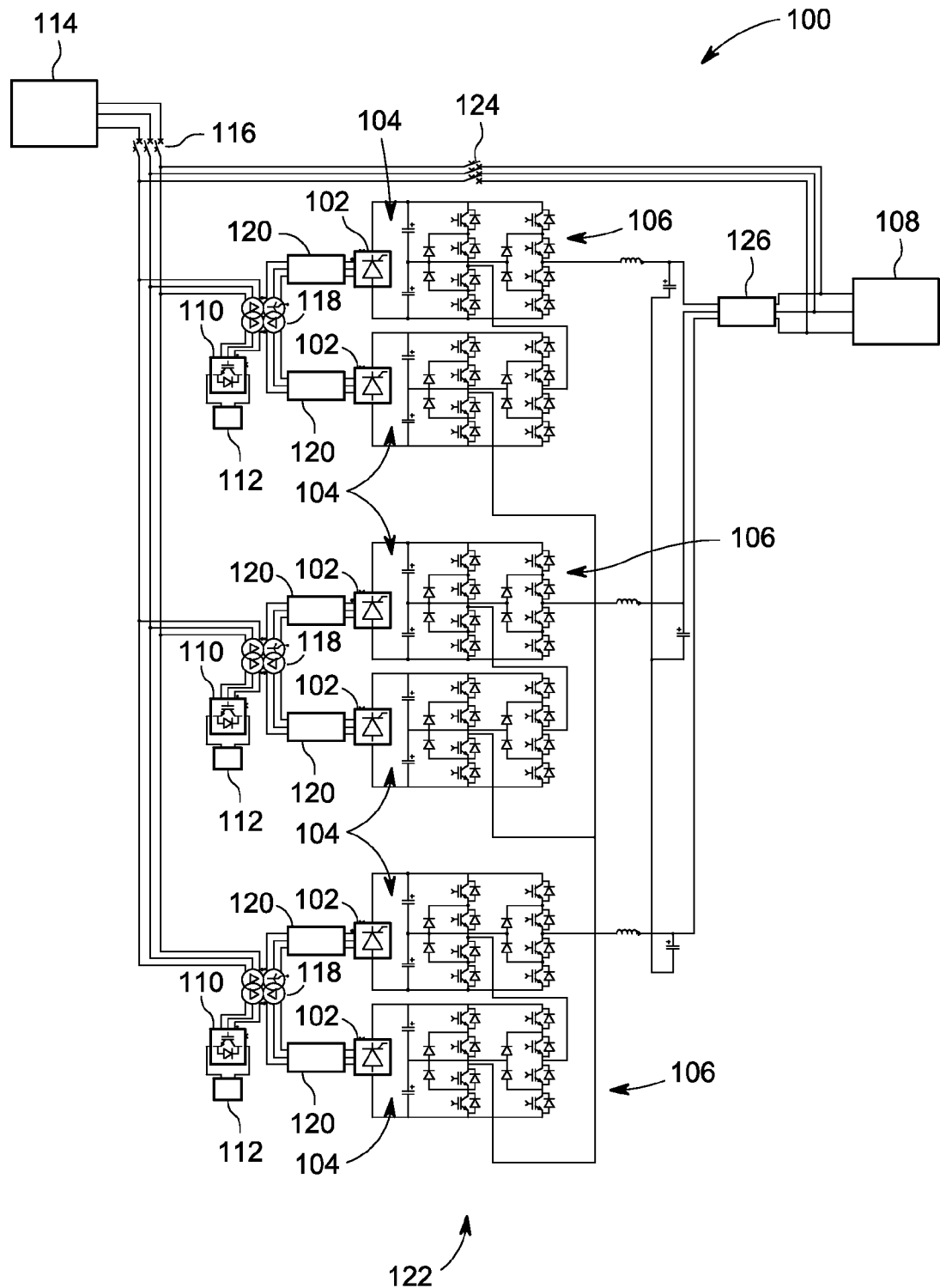
FIGS. 1-6 show example embodiments of the method and apparatus described herein.

Although specific features of various embodiments may be shown in some drawings and not in others, this is for convenience only. Any feature of any drawing may be referenced and/or claimed in combination with any feature of any other drawing.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

The following detailed description illustrates embodiments of the disclosure by way of example and not by way of limitation. It is contemplated that the disclosure has general application to embodiments of providing increased availability electrical power in industrial, commercial, and residential applications.

Embodiments of a three-phase high power transformer-based medium voltage (MV) uninterruptible power supply (UPS) system are described herein. In various embodiments, the UPS system includes an active or passive rectifier that regulates a set of DC link voltages, a cascaded set of Neutral Point Clamped (NPC) inverters that use the DC link voltages and create a high ac voltage, a set of bi-directional battery converters are used to charge the battery banks when the ac mains are present and to discharge the battery banks and create a three-phase ac voltage at the transformer terminals when the AC mains voltage if low or approximately zero. Embodiments of the present disclosure provide that the battery bank can be a single battery bank or multiple banks. The UPS system further includes a bypass switch that connects the AC mains directly to the load when the UPS is in bypass mode. In operation, the modes of operation of the UPS are selectable either manually by a user or automatically by way of, for example, but not limited to, a controller, a protective device, or a computer-implemented control system.

When in a normal mode of operation and the AC mains voltage is nominal, the UPS operates in the double conversion mode. The rectifiers draw power from the AC mains and regulate the DC link voltages. The NPC inverters are controlled such that they create a regulated three-phase AC voltage at their terminals irrespective of balanced or unbalanced linear or non-linear loads applied to the terminals. The battery converters are controlled to charge the battery banks.

When in a battery mode of operation and the AC mains voltage is not nominal, the UPS shifts to battery mode of operation. During this operation, the mains breaker is off, the battery converters are controlled to operate as inverters and they create a nominal regulated AC voltage in the terminals of the transformers. During this operation, one of the battery converters operates as master inverter and the others operate as slaves pushing power or current into the AC voltage created by the master inverter.

When in a bypass mode of operation and the main inverters 106 or rectifier 102 fail or are secured due to scheduled maintenance, the UPS is shifted to bypass mode of operation. The AC mains circuit breaker (CB) is turned on. The bypass switch (realized by any means, e.g. semiconductor devices, electromechanical devices) is turned on. The rectifier and inverters are switched off (no gate pulses) and the load isolator switch is turned off. The load is directly powered by the AC mains.

An additional degree of freedom is related to the battery mode of operation. During the battery mode of operation, instead of powering the load through the rectifier and inverter, power can be directed to the load directly through the bypass switch. This has the following advantages: (a) as the number of power processing stages in battery mode is reduced, the same size battery can provide extended back up time and (b) the operation provides redundancy when the main rectifier/inverter fails. It may be noticed that during such operation, the gate pulses to rectifier and inverter are turned off (similar to bypass operation) and the isolators are turned off to avoid energizing the rectifier/inverter.

When the main inverter fails, the load power can still be maintained thus providing additional redundancy in operation and increasing the availability. During the battery mode of operation, as the number of power processing stages is reduced from three (battery converter+rectifier+inverter) to one (battery converter+bypass), the power to load is transferred more efficiently. This provides additional load back-up time for the same size of battery bank.

A technical advantage of the MV-UPS as described herein is that it improves a redundancy in the UPS that facilitates continued operation during main rectifier/inverter module fault conditions because the bypass switch makes it possible to isolate the faulted main rectifier/inverter without interrupting power to the load. The MV-UPS also improves efficiency because multiple stages of conversion are avoided using the battery mode of operation and for the same battery bank, the battery mode can increase backup time provided to the load.

The following description refers to the accompanying drawings, in which, in the absence of a contrary representation, the same numbers in different drawings represent similar elements.

FIG. 1 is a schematic diagram of a three-phase high power transformer-based medium voltage uninterruptible power supply (MV-UPS) system 100. In the example embodiment, UPS system 100 includes a plurality of low-voltage low-power modules cascaded in electrical series. UPS system 100 also includes an active or passive rectifier 102 that generates and regulates a set of DC voltage links 104. When using active rectifiers, DC voltage links 104 are regulated against line and load variations. In various embodiments, active or passive rectifier 102 may be embodied in for example, but not limited to, thyristors, pulse active rectifiers, and diodes.

A set of neutral point clamped (NPC) inverters 106 cascaded in series use the DC link voltages to generate a high AC voltage for output to a load 108. A set of bi-directional battery converters 110 are configured to charge a respective bank of batteries 112 when power from an AC mains source 114, supplied through an AC mains breaker 116, is within an allowable nominal range and to discharge bank of batteries 112 to generate a three-phase AC voltage at terminals of a transformer 118 when AC mains source 114 voltage is outside the allowable threshold range. Bank of batteries 112 may be a single battery bank or multiple banks. An isolator and fuse device 120 positioned between transformer 118 and rectifier 102 provides isolation capabilities and overcurrent protection for an input of inverter modules 122. Each inverter module 122 includes DC link 104 and inverters 106. A bypass switch 124 connects the AC mains directly to the load when UPS system 100 is in bypass mode. A load isolator and fuse device 126 isolate and protect load 108 from electrical faults.

Figure 2:
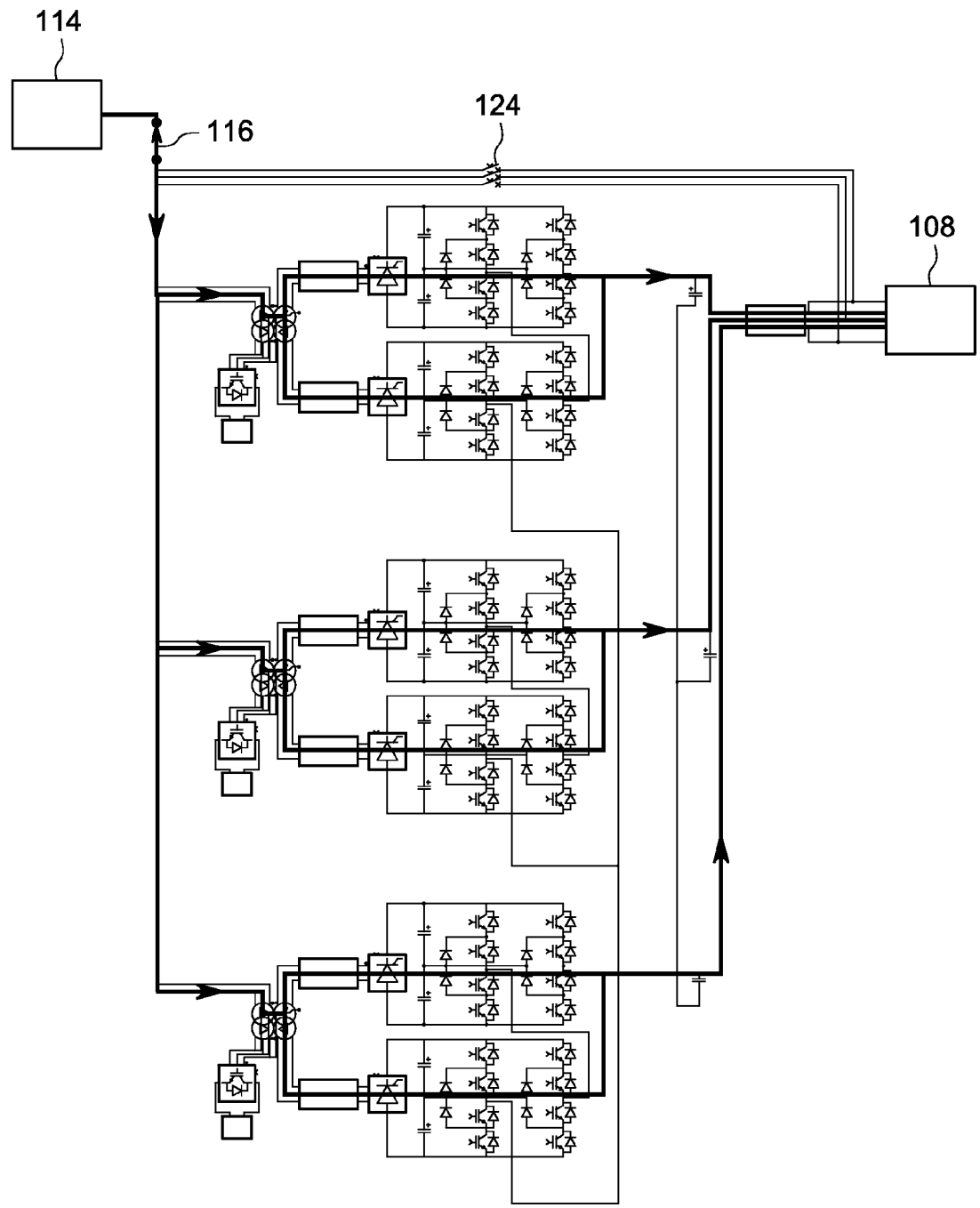

FIG. 2 is a schematic diagram of power flow through UPS system 100 in a normal operating mode in accordance with an example embodiment of the present disclosure. In the normal operating mode, UPS system 100 operates in a double-conversion mode, AC mains breaker 116 is closed and bypass switch 124 is open. Power flows from AC mains source 114 through AC mains breaker 116 to each of transformers 118. In the example embodiment, transformers 118 distribute power to a respective battery converter 110 and respective isolator and fuse devices 120. Battery converters 110 maintain a charge on respective batteries and isolator and fuse devices 120 protect an input of active rectifiers 102 and inverter modules 122. Rectifiers 102 supply DC power to DC link 104, which are used by inverters 106 to generate high voltage AC power for load 108.

In the normal operating mode, the output voltage, frequency, and phase are controlled to be nearly equal to the AC mains voltage, frequency, and phase so that UPS system 100 can be shifted to bypass mode of operation for maintenance without affecting load 108. In another embodiment, the output voltage is controlled at a predefined programmable value and only the output frequency and phase are controlled to be nearly equal to the AC mains frequency and phase.

Figure 3:
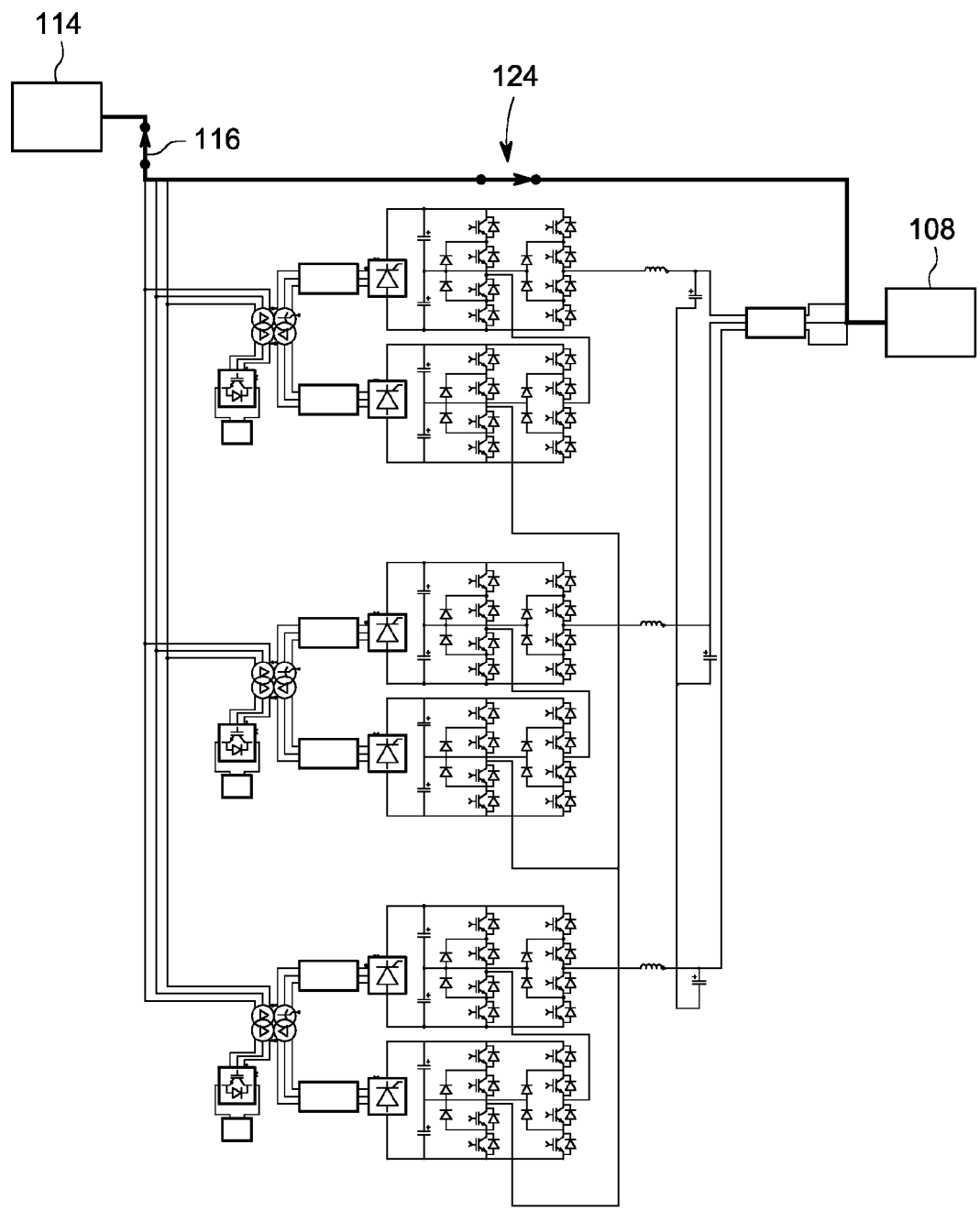

FIG. 3 is a schematic diagram of power flow through UPS system 100 in a bypass operating mode in accordance with an example embodiment of the present disclosure. When any of isolator and fuse devices 120, active rectifiers 102, inverter modules 122, or transformers 118 fail or are secured due to scheduled maintenance, UPS system 100 is shifted to bypass mode of operation. AC mains CB 116 is closed. Bypass switch 124, which may be realized using semiconductor devices is turned on. Active rectifier 102 and inverters 106 are switched off (no gate pulses) and load isolator and fuse device 126, which may be embodied is a circuit breaker, is turned off. In the bypass mode of operation, load 108 is directly powered by AC mains source 114.

Figure 4:
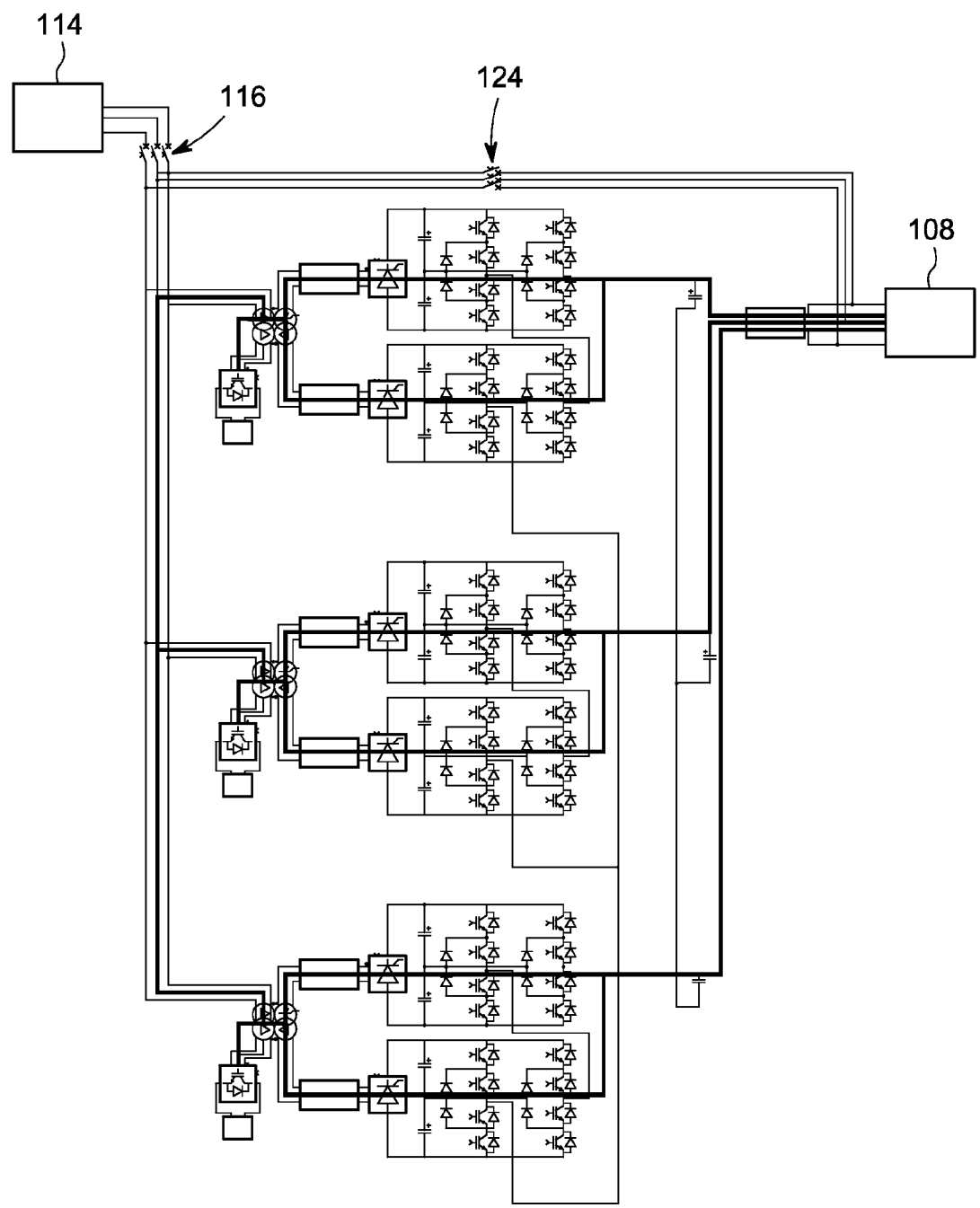

FIG. 4 is a schematic diagram of power flow through UPS system 100 in a battery operating mode in accordance with an example embodiment of the present disclosure. When a voltage of AC mains source 114 is outside the allowable range, UPS system 100 shifts to the battery mode of operation. During the battery mode, AC mains CB 116 is open, battery converters 110 are controlled to operate as inverters and are configured to generate a nominal regulated AC voltage in the terminals of transformers 118. When using multiple transformers and battery converters as shown in FIG. 4, during the battery mode, one of battery converters 110 operates as master inverter dictating the voltage at the respective transformer 118 primary and the other battery converters 110 operate as slaves pushing power or current into the AC voltage created by the master inverter. Rectifiers 102 supply DC power to DC link 104, which are used by inverters 106 to generate high voltage AC power for load 108.

Figure 5:
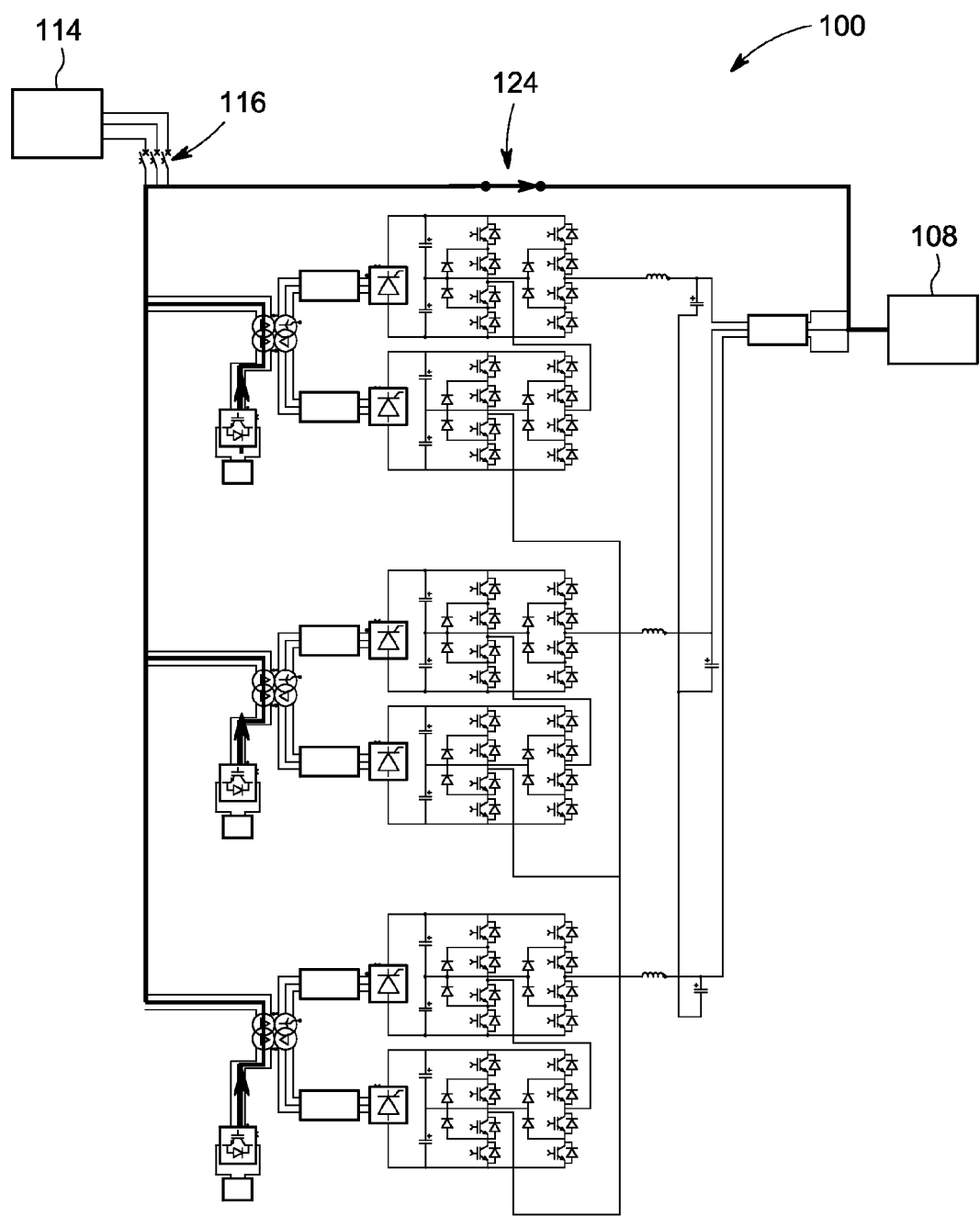

FIG. 5 is a schematic diagram of power flow through UPS system 100 in a backfeed operating mode in accordance with an example embodiment of the present disclosure. When a voltage of AC mains source 114 is outside the allowable range and any of the UPS components is out of service, for example, isolator and fuse devices 120, rectifiers 102, DC link 104, or inverters 106, UPS system 100 may shift to the backfeed mode of operation. During the backfeed mode, AC mains CB 116 is open and bypass 124 is closed or on. Battery converters 110 are controlled to operate as inverters and are configured to generate a nominal regulated AC voltage in the terminals of transformers 118. One of battery converters 110 may operate as the master inverter dictating the voltage at the respective transformer 118 and the other battery converters 110 may operate as slaves pushing power or current into the AC voltage created by the master inverter. Rectifiers 102, DC links 104, and inverters 106 are switched off (no gate pulses) and load isolator and fuse device 126 is turned off. In the backfeed mode of operation, load 108 is directly powered from batteries 112 through battery converters 110 and transformer 118.

Figure 6:
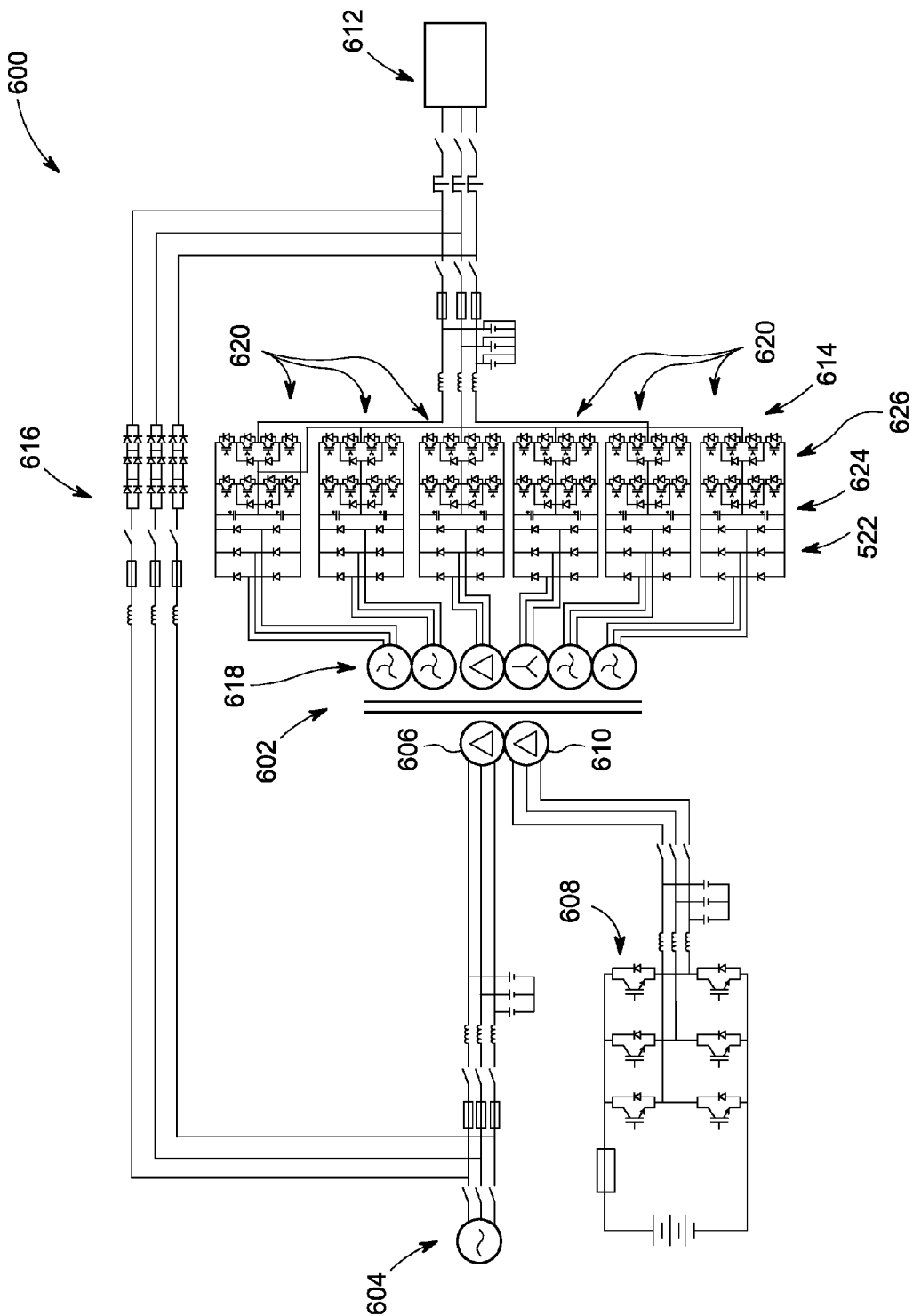

FIG. 6 is a schematic diagram of an alternate embodiment of a UPS system 600 in accordance with an example embodiment of the present disclosure. In the example embodiment, UPS system 600 includes a single multi-winding transformer 602 that receives AC power from an AC mains source 604 at a first primary winding 606 or from a battery supply subsystem 608 at a second primary winding 610. Power to a load 612 can be supplied from an inverter assembly 614 or directly from AC mains source 604 through a bypass switch assembly 616. Secondary windings 618 are each coupled to a separate train 620 of inverter assembly 614. In the example embodiment, inverter assembly 614 includes six trains 620 that each include a three-phase diode bridge rectifier 622, a DC link 624, and a cascaded H-bridge inverter 626.

During operation, UPS system 600 operates substantially similarly to UPS system 100 in that, power to load 612 can come from AC mains source 604 or battery supply subsystem 608 when AC mains source 604 is unavailable. The power is directed through transformer 602 and inverter assembly 614. Power to load 612 can also come from AC mains source 604 through bypass switch assembly 616.

Moreover, power can be supplied to load 612 from battery supply subsystem 608 through second primary winding 610, first primary winding 606, and bypass switch assembly 616. In this mode inverter assembly 614 and AC mains source 604 are secured and/or isolated.

The above-described embodiments of a power supply method and uninterruptible power supply system provides a cost-effective and reliable means for increasing a reliability, availability, and efficiency of the uninterruptible system. More specifically, the methods and systems described herein facilitate routing electrical power to a load through a plurality of paths selectable based on UPS component availability and/or health. In addition, the above-described methods and systems facilitate improving an efficiency of the UPS system during battery modes of operation to increase battery life during time periods when the AC mains is unavailable. As a result, the methods and systems described herein facilitate providing power to a load in a cost-effective and reliable manner.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An uninterruptible power supply (UPS) configured to supply high power at a medium-voltage using a plurality of power modules coupled in electrical series, said UPS comprising:
   a three-phase high power transformer;
   a rectifier configured to generate and regulate a set of DC link voltages;
   a cascaded set of inverters configured to generate a high alternating current (AC) voltage using the DC link voltages;
   a set of bi-directional battery converters configured to:
      charge a bank of backup batteries when power is available from an AC mains source; and
      discharge the bank of backup batteries to generate a three-phase AC voltage at terminals of said three-phase high power transformer when the AC mains source voltage falls outside a predetermined voltage range; and
   a bypass switch configured to:
      electrically couple the AC mains source directly to a load when said UPS is in a bypass mode of operation; and electrically couple the bank of backup batteries to the load through the set of bi-directional battery converters and the transformer.

2. The UPS of claim 1, wherein said UPS is a double-conversion type UPS.

3. The UPS of claim 1, wherein said cascaded set of inverters comprises a plurality of cascaded inverters per phase.

4. The UPS of claim 1, wherein said cascaded set of inverters comprises a cascaded set of Neutral Point Clamped (NPC) inverters.

5. The UPS of claim 1, wherein said bank of backup batteries comprises at least one of a single bank of backup batteries and a plurality of banks of backup batteries.

6. The UPS of claim 1, wherein said bypass switch is configured to electrically couple the bank of backup batteries to the load through the set of bi-directional battery converters and a primary winding of the transformer.

7. The UPS of claim 1, wherein said bypass switch is configured to electrically couple the bank of backup batteries to the load through the set of bi-directional battery converters and a primary winding of each of the three multi-winding transformers.

8. A method of operating an uninterruptible power supply (UPS) system, said method comprising:
 selecting one of a normal mode of operation, a battery mode of operation, and a bypass mode of operation for the UPS;
 in the normal mode of operation:
  supplying electrical power from an AC mains source to a load through a rectifier and a set of inverters of the UPS; and
  maintaining a charge on a bank of backup batteries using a battery converter operating as an active rectifier;
 in the battery mode of operation, supplying electrical power from the bank of backup batteries through a bi-directional battery converter to a load through the rectifier and the set of inverters of the UPS;
 in the bypass mode of operation, supplying electrical power from the AC mains source directly to a load through a bypass switch.

9. The method of claim 8, further comprising selecting the normal mode of operation for the UPS when the AC mains source voltage is within a predetermined normal operating range.

10. The method of claim 8, further comprising selecting the battery mode of operation for the UPS when the AC mains source voltage is outside the predetermined normal operating range.

11. The method of claim 8, further comprising selecting the bypass mode of operation for the UPS when at least one of a rectifier and a set of inverters of the UPS are not operating.

12. The method of claim 8, wherein in the normal mode of operation, supplying electrical power through a rectifier and a set of inverters of the UPS comprises at least one of maintaining a voltage, a phase, and frequency of the supplied power substantially equal to a voltage, a phase, and frequency, respectively, of the AC mains source and maintaining a phase and frequency of the supplied power substantially equal to a phase and frequency, respectively, of the AC mains source and the voltage at a predefined programmable value.

13. The method of claim 8, wherein in the battery mode of operation, supplying electrical power from the bank of backup batteries through a bi-directional battery converter comprises operating one of a plurality of phase battery converters as a master inverter controlling a voltage at the transformer terminals and operating a remainder of the plurality of phase battery converters as slaves supplying electrical power at the voltage maintained by the master.

14. An uninterruptible power supply (UPS) system comprising:
 an AC mains source comprising an AC mains switch, said AC mains source configured to at least one of supply electrical power to a load through a bypass switch and supply electrical power to the load through a double conversion UPS, a combination of positions of said AC mains switch and said bypass switch define a mode of operation of said UPS system wherein:
  when both switches are closed, said UPS system is in a bypass mode of operation,
  when said AC mains switch is open and said bypass switch is open or closed, said UPS system is in a battery mode of operation; and
  when said AC mains switch is closed and said bypass switch is open, said UPS system is in a normal mode of operation;
 an uninterruptible power supply (UPS) comprising:
  a three-phase high power transformer;
  a rectifier configured to generate and regulate a set of DC link voltages;
  a set of cascaded inverters configured to generate a high alternating current (AC) voltage using the DC link voltages; and
  a set of bi-directional battery converters configured to:
   charge a bank of backup batteries when power is available from an AC mains source; and
   discharge the bank of backup batteries to generate a three-phase AC voltage at terminals of said three-phase high power transformer when the AC mains source voltage exceeds a predetermined threshold range.

15. The system of claim 14, wherein said bypass switch is configured to:
 electrically couple the AC mains source directly to a load when said UPS is in a bypass mode of operation; and
 electrically couple the bank of backup batteries to the load through the set of bi-directional battery converters and the transformer.

16. The UPS system of claim 14, wherein said cascaded set of inverters comprises a cascaded set of Neutral Point Clamped (NPC) inverters.

17. The UPS system of claim 14, wherein said bank of backup batteries comprises at least one of a single bank of backup batteries and a plurality of banks of backup batteries.

18. The UPS system of claim 14, wherein said bypass switch is configured to electrically couple the bank of backup batteries to the load through the set of bi-directional battery converters and a primary winding of the transformer.

19. The UPS system of claim 14, wherein said bypass switch is configured to electrically couple the bank of backup batteries to the load through the set of bi-directional battery converters and each of three phases of a primary winding of the transformer.

20. The UPS system of claim 14, wherein said set of cascaded inverters comprises a plurality of cascaded inverters per phase.

* * * * *